Patented Jan. 11, 1949

2,458,780

UNITED STATES PATENT OFFICE 2,458,780

ANTIOXIDANTS

Louis H. Howland, Watertown, Conn., assignor to United States Rubber Company, New York, N. Y., a corporation of New Jersey No Drawing. Application December 6, 1945, Serial No. 633,267

1 Claim. (Cl. 260—800)

This invention relates to a new class of antioxidants or age-resisters for organic substances which tend to deteriorate by absorption of oxygen from the air, e. g., rubber or allied gums, unsaturated fatty oils, such as unsaturated vegetable oils, essential oils, petroleum oils and their derivatives, such as gasolines, soaps, aldehydes, synthetic resins, turpentine, insecticides, such as derris root, cube root, and pyrethrum, and the like.

According to the invention, the organic substances are incorporated with a compound having a heterocyclic ring composed of 3 carbons and 2 nitrogens arranged so that the 3 carbons are joined together and the 2 nitrogens are joined together, one of the nitrogens being joined to hydrogen, said nitrogen being directly connected to carbon of a keto group. The chemicals are referred to as ketopyrazolines (pyrazolones).

The pyrazolones of this invention contain the nucleus:

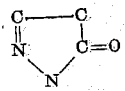

Pyrazolone itself, namely 5-pyrazolone, has the structure

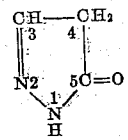

which is in tautomeric equilibrium with

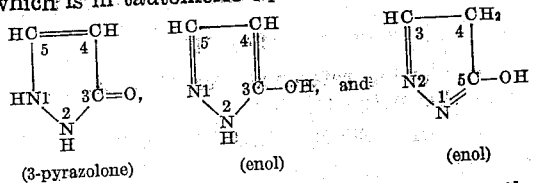

(3-pyrazolone)　　　(enol)　　　(enol)

For the purposes of this invention, the tautomers and enols where they occur are to be considered equivalents of the 5-pyrazolone chemicals.

The preparation of these pyrazolones is well known. As general preparative references, the following are given: Hans Meyer, Synthese Der Kohlenstoff—verbindungen (Heterocyclen), pages 1006–1008 (Julius Spring, Vienna, 1940). Julius Cohen—Organic Chemistry, part 1, page 261 (Longmans, Green and Co., New York, 1919).

Exemplary of preferred compounds falling within the scope of this invention are: pyrazolone, 1-phenyl 5-pyrazolone, 2-methyl 1-phenyl 5-pyrazolone, 3-methyl 5-pyrazolone, 4-methyl 5-pyrazolone, 3,4-dimethyl 5-pyrazolone, 1,3,4-trimethyl 5-pyrazolone, 4-allyl 3,4-dimethyl 1-phenyl 5-pyrazolone, 3 benzyl 5-pyrazolone, 3-methyl 4-butyl 5-pyrazolone, 1-phenyl 3-methyl 5-pyrazolone, 3-methyl 4-lauryl 5-pyrazolone, 4-cyclopentyl 3-methyl 1-phenyl 5-pyrazolone.

The following examples are given to illustrate the preparation and use of the chemicals, the parts being by weight.

EXAMPLE 1.—4-N-BUTYL 3-METHYL 5-PYRAZOLONE

An aqueous solution (11.7 g.) of 85% hydrazine hydrate is stirred into 37.2 g. ethyl-α-n-butyl acetoacetate. After a short time a crystalline mass is formed. It is heated for an hour on a steam bath during which time alcohol is evolved and a high melting solid is formed. Upon recrystallization from alcohol, 12 g. 4-n-butyl 3-methyl 5-pyrazolone, melting 203–205° C., are obtained.

EXAMPLE 2.—4-N-DODECYL 3-METHYL 5-PYRAZOLONE

Ethyl α-n-dodecyl acetoacetate (13.4 g.) Kuhn; J. Prakt Chem. 156 103 (1940), and 2.8 g. of an 85% aqueous solution of hydrazine hydrate are mixed with stirring. The mixture becomes warm and soon a white crystalline mass forms. This is heated on a steam bath for 2½ hours during which time alcohol is evolved and a high melting solid is produced. Upon recrystallization from alcohol, 5 g. of 4-n-dodecyl 3-methyl 5-pyrazolone, melting at 169–173° C., are obtained.

EXAMPLE 3.—RUBBER TESTS

TABLE I

*Tests on crude polymer*

| | A | B | C | D | E | F |
|---|---|---|---|---|---|---|
| 1,3-Butadiene (75)-Styrene (25) copolymer | 100 | 100 | 100 | 100 | 100 | 100 |
| 3-Methyl 5-pyrazolone | | 2.0 | | | | |
| 3,4-Dimethyl 5-pyrazolone | | | 2.0 | | | |
| 4-Butyl 3-methyl 5-pyrazolone | | | | 2.0 | | |
| 3-Methyl 1-phenyl 5-pyrazolone | | | | | 2.0 | |
| 4-Dodecyl 3-methyl 5-pyrazolone | | | | | | 2.0 |

The chemicals are milled into the rubber and samples of the milled stocks are aged in air at 212° F. The following tabe gives the time at which the various rubber stocks show signs of deterioration, as evidenced by hardening and formation of a skin.

TABLE II

*Tests on processed and vulcanized polymer*

| Stock | Chemical | Hours |
|---|---|---|
| A | Control | 4 |
| B | 3-Methyl 5-pyrazolone | 360 |
| C | 3,4-Dimethyl 5-pyrazolone | 72 |
| D | 4-Butyl 3-methyl 5-pyrazolone | 72 |
| E | 3-Methyl 1-phenyl 5-pyrazolone | 96 |
| F | 4-Dodecyl 3-methyl 5-pyrazolone | 48 |

The rubber stocks are compounded according to the following recipe:

Master batch

| | |
|---|---|
| 1,3-butadiene (75)-styrene (25) copolymer rubber | 100 |
| Titanium dioxide | 50 |
| Lithopone | 75 |
| Paraffin oil | 5 |
| Zinc oxide | 10 |
| Mercaptobenzothiazole | 2.0 |
| Tetramethyl thiuram monosulfide | 0.2 |
| | 242.2 |

TABLE III

| | G | H | I | J | K | L |
|---|---|---|---|---|---|---|
| Above Master Batch | 242.2 | 242.2 | 242.2 | 242.2 | 242.2 | 242.2 |
| 3-Methly 5-pyrazolone | 2.0 | | | | | |
| 3-4-Dimethyl 5-pyrazolone | | 2.0 | | | | |
| 4-Butyl 3-methyl 5-pyrazolone | | | 2.0 | | | |
| 3-Methyl 1-phenyl 5-pyrazolone | | | | 2.0 | | |
| 4-Dodecyl 3-methyl 5-pyrazolone | | | | | 2.0 | |
| | | | | | | 2.0 |

The stocks are cured 90 minutes at 45 pounds per square inch steam pressure, and exposed to sunlight under glass for several days. Substantially no discoloration occurred during this exposure.

EXAMPLE 4

Mixtures of boiled linseed oil with pyrazolones were made up according to the following recipe:

TABLE IV

| | A | B | C | D | E | F |
|---|---|---|---|---|---|---|
| Boiled linseed oil | 100.0 | 100.0 | 100.0 | 100.0 | 100.0 | 100.0 |
| 3-Methyl 5-pyrazolone | | 1.5 | | | | |
| 3,4-Dimethyl 5-pyrazolone | | | 1.5 | | | |
| 1-Phenyl-3-methyl 5-pyrazolone | | | | 1.5 | | |
| 3-Methyl-4-butyl 5-pyrazolone | | | | | 1.5 | |
| 3-Methyl-4-lauryl 5-pyrazolone | | | | | | 1.5 |

Equal portions of mixtures of A, B, C, D, E, and F are poured into shallow glass dishes and the open dishes exposed to the atmosphere at room temperature. The samples are examined at 24 hour intervals for appearance of a surface film. The results are recorded in the following table:

| | Hours of Exposure Before Formation of Film is Observed |
|---|---|
| Sample A (blank) | 24 |
| Sample B | 96 |
| Sample C | 72 |
| Sample D | 96 |
| Sample E | 72 |
| Sample F | 96 |

It is apparent that each of the antioxidants retarded the oxidation of the linseed oil.

The invention may be applied to the preservation of, broadly, natural rubber compositions as well as artificially-prepared rubber compositions, such as polychloroprene, olefin polysulfides, butadiene polymers, modified butadiene polymers (Buna N and Buna S), and including reclaims, and latices of such compositions.

It is also to be understood that other desired filling and compounding ingredients may be incorporated along with the preservative, for example, in the case of a rubber, there may be incorporated accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the antioxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorportion by diffusion, to the surface of vulcanized or unvulcanized rubber goods.

Having thus described my invention, what I claim and desire to protect by Letters Patent is:

A rubber composition containing from 0.1 to 5% by weight of a 5-pyrazolone from the class consisting of 5-pyrazolone, 1-phenyl 5-pyrazolone, 2-methyl 1-phenyl 5-pyrazolone, 3-methyl 5-pyrazolone, 4-methyl 5-pyrazolone, 3,4-dimethyl 5-pyrazolone, 1,3,4-trimethyl 5-pyrazolone, 4-allyl 3,4-dimethyl 1-phenyl 5-pyrazolone, 3-benzyl 5-pyrazolone, 3-methyl 4-butyl 5-pyrazolone, 1-phenyl 3-methyl 5-pyrazolone, 3-methyl 4-lauryl 5-pyrazolone, 4-cyclopentyl 3-methyl 1-phenyl 5-pyrazolone.

LOUIS H. HOWLAND.

REFERENCES CITED

The following references are of record in the file of this patent:

UNITED STATES PATENTS

| Number | Name | Date |
|---|---|---|
| 2,017,815 | Johnston | Oct. 15, 1935 |
| 2,090,484 | Ostromislensky | Aug. 17, 1937 |
| 2,382,904 | Pedersen | Aug. 14, 1945 |